UNITED STATES PATENT OFFICE.

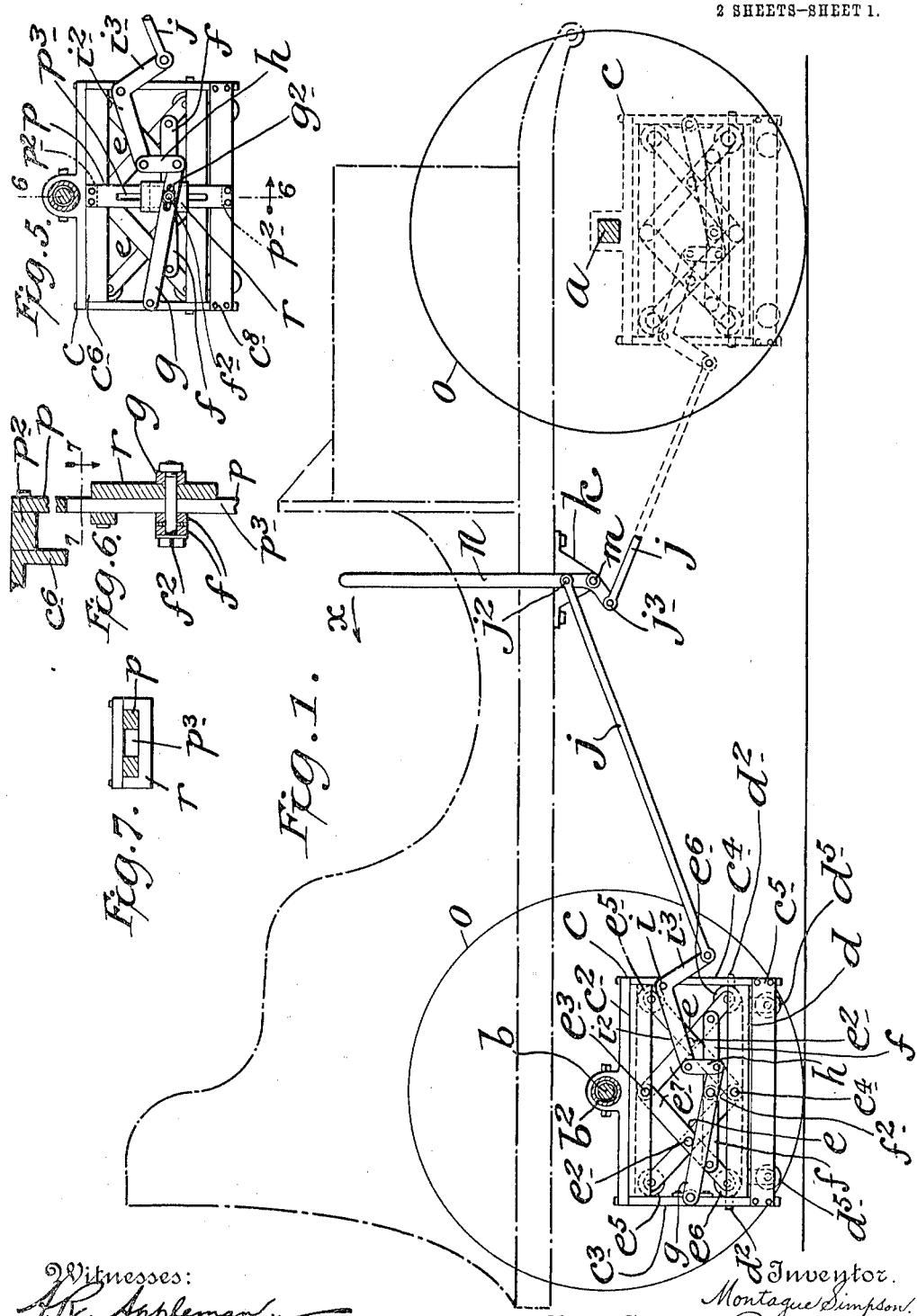

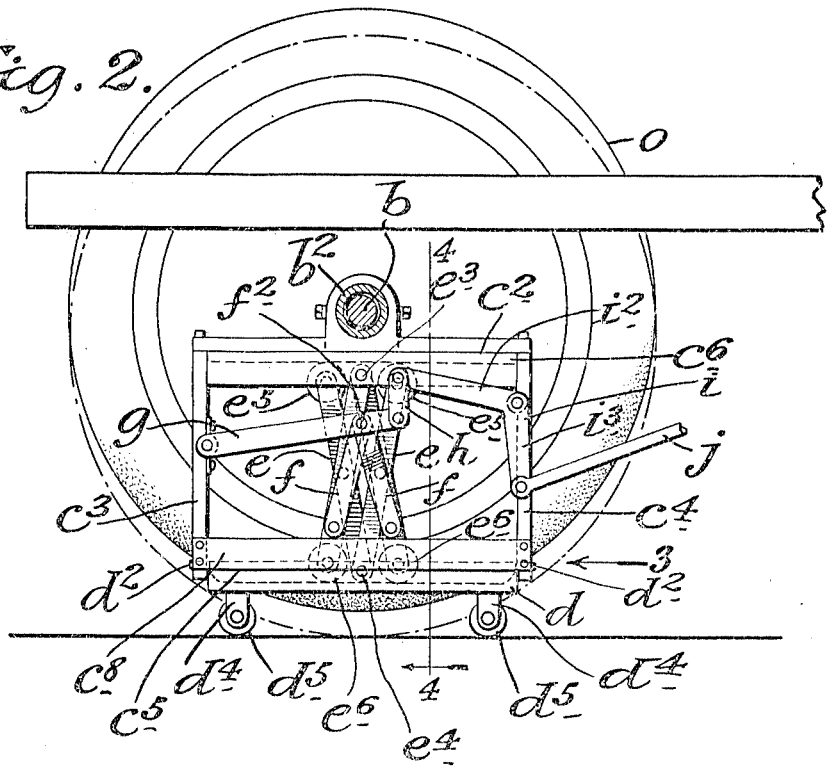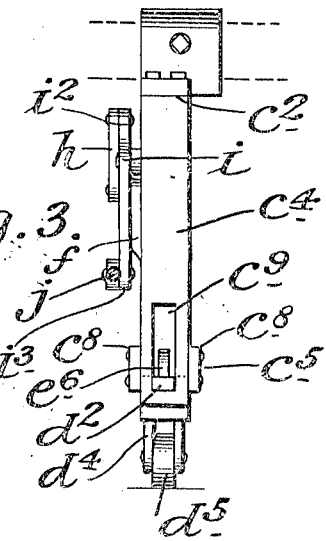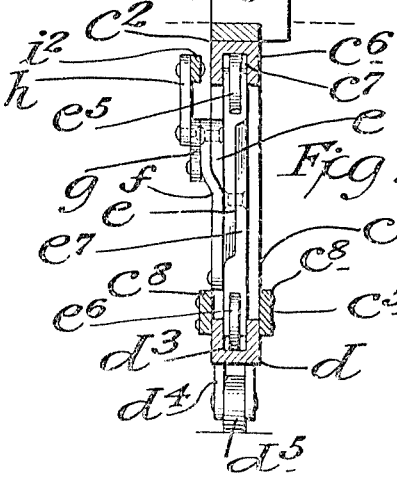

MONTAGUE SIMPSON, OF NEW YORK, N. Y.

JACK APPARATUS FOR VEHICLES.

1,072,183.       Specification of Letters Patent.       Patented Sept. 2, 1913.

Application filed June 19, 1912. Serial No. 704,480.

*To all whom it may concern:*

Be it known that I, MONTAGUE SIMPSON, a citizen of Great Britain, and residing at New York, in the county of New York and State of New York, have invented certain new and useful Improvements in Jack Apparatus for Vehicles, of which the following is a specification, such as will enable those skilled in the art to which it appertains to make and use the same.

This invention relates to jack apparatus of devices for use in connection with vehicles, and particularly for use in connection with automobiles, and the object thereof is to provide an improved apparatus of this class by means of which the vehicle may be instantly raised above the ground or surface over which it is moving while in motion in order that said vehicle may be brought to a quick stop so as to prevent a collision or the striking of an object or person by the vehicle when in motion; a further object being to provide an apparatus of the class described, by means of which a vehicle of the class specified may be raised from the ground in the case of the bursting or explosion of a tire so as to save the shoe of a tire, or the rim of a wheel, and to prevent possible injury to the occupants of the vehicle, and whereby a vehicle of the class specified, when standing still or in a garage, may be easily raised above the ground so as to relieve the tires of pressure occasioned by the weight of the vehicle.

The invention is fully disclosed in the following specification of which the accompanying drawing forms a part, in which the separate parts of my invention are designated by suitable reference characters in each of the views, and in which:—

Figure 1 is a diagrammatic side view of an automobile showing the axles in section and showing my improvement applied;—Fig. 2 a view similar to Fig. 1, but on an enlarged scale, and showing the operation of the jack to raise the vehicle;—Fig. 3 an end view of one member of the jack apparatus looking in the direction of the arrow 3 of Fig. 2;—Fig. 4 a vertical section of said member of the jack apparatus on the line 4—4 of Fig. 2;—Fig. 5 a view similar to Fig. 1, but showing only one jack member and showing a modification; Fig. 6 a partial section on the line 6—6 of Fig. 5, and on an enlarged scale, and;—Fig. 7 a section on the line 7—7 of Fig. 6.

In the accompanying drawing, Fig. 1, I have indicated in outline the body of an automobile, and I have shown the front axle $a$ and the rear axle $b$ in full lines, and said rear axle $b$ is inclosed in a tube or sleeve $b^2$ in which it is free to turn, and my improved apparatus, when used for the purpose specified as shown in the accompanying drawing, is preferably composed of four separate similar parts $c$ two of which are suspended from each axle and on the inner sides of the wheels thereof, the rear parts of the apparatus being suspended from the sleeve $b^2$ through which the rear axle passes and to which they are secured.

Each of the parts $c$ consists of a strong rectangular frame composed of a top member $c^2$, side members $c^3$ and $c^4$ and a bottom member $c^5$. The top member $c^2$, in the form of construction shown is composed of two parts, the inner part $c^6$ thereof being provided with a deep longitudinal groove $c^7$, and the bottom member $c^5$, in the form of construction shown, is composed of two parallel side members $c^8$.

The side members $c^3$ and $c^4$ of the frame are provided in the lower end portions thereof with vertical slots $c^9$ and mounted therein is a vertically movable horizontal bar $d$ having end members $d^2$ movable in the slots $c^9$, and said bar $d$ is provided in the top thereof with a groove $d^3$ and on the bottom thereof with downwardly directed ears or hangers $d^4$ in which are mounted rollers $d^5$.

Mounted between the top members $c^2$ of the jack-frame and the bar $d$ are two pairs of toggle levers $e$ each of which consists of two members pivoted together at $e^2$, and the corresponding members of each pair of toggle levers are pivoted together at one end, as shown at $e^3$ and $e^4$, and said toggle lever members are provided at their other ends with anti-friction rollers $e^5$ movable in the groove $c^7$ in the top member of the jack-frame, and rollers $e^6$ movable in the groove $d^3$ in the bar $d$.

The lower end portions of the toggle lever members $e^7$ are connected by a horizontal link device $f$ pivoted thereto, and which consists of two separate parts of similar length pivoted together at $f^2$, and pivoted to the side member $c^3$ of the jack-frame is another link device $g$ which is also pivoted at $f^2$ and which projects beyond the pivotal point at $f^2$, and is provided with a short link device $h$, and pivoted to the side member $c^4$ of the jack-frame is a crank lever $i$ the longer arm $i^2$ of which is pivoted to the link device $h$, and the shorter arm $i^3$ of which is connected with a crank rod $j$.

As hereinbefore stated two of the jack devices, or jack-frame devices $c$ are used in connection with each axle, and said jack devices are used in pairs at the opposite sides of the vehicle or on the opposite end portions of the axles, and the position of the said jack devices on the front axle is the reverse of the position of said jack devices on the rear axle, and the chassis or truck frame is provided on its opposite sides and forwardly of the seat of the operator with hangers $k$ which support a transverse shaft $m$ to one end of which is secured a lever $n$, and the crank rod $j$ of the corresponding jack device on the rear axle is pivoted to the said lever above the shaft $k$, as shown at $j^2$, while the crank rod $j$ of the corresponding jack device on the front axle is connected with a backwardly directed arm of the lever $n$ at the lower end thereof, as shown at $j^3$.

The normal position of the separate parts, or separate jack devices, or frames, is that shown in Fig. 1, in which the vertically movable bars $d$ in the separate jack devices or frames are supported above the bottom of said frames, and the bottoms of said frames supported at a predetermined point above the ground, or the road over which the vehicle moves, and with this construction it will be apparent that when the lever $n$ is moved backwardly in the direction of the arrow X the crank levers $i$ of the corresponding jack devices at both sides of the vehicles will operate the toggle levers $e$ to depress the vertically movable bars $d$ in the jack-frames or devices $c$, as shown in Fig. 2, and this operation will raise the vehicle bodily, as indicated in dotted lines in said figure, and the weight thereof will rest on the rollers $d^5$ supported by the bar $d$, and this operation will bring the vehicle to an immediate stop, or approximately so, the weight of the vehicle being supported on the said rollers instead of on the wheels which are indicated at O. Of course, the transference of the weight of the vehicle from the wheels thereof to the rollers $d^4$ does not operate to absolutely stop the vehicle, but the forward movement of the vehicle would be instantly reduced to a large extent and the force of said movement would be reduced to a minimum, and the vehicle would be quickly brought to a full stop.

In Figs. 5 to 7 inclusive, I have shown a modification of the construction of the jack members in which a vertical plate $p$ is secured centrally to the outside of the jack frame and to the top frame member $c^6$ and one of the bottom frame members $c^8$ from which the plate $p$ is separated by spacing blocks $p^2$, and said plate $p$ is provided with a vertical slot $p^3$ and mounted thereon is a slide $r$, and the pivot pin $f^2$ which connects the link members $f$ passes through the slot $p^3$ and the link device $g$ is provided with a longitudinal slot $g^2$ through which the pin $f^2$ passes. With this construction the operation of the separate jack members will be the same as with the construction shown in Figs. 1, 2, 3 and 4, but the parts $p$ and $r$ serve as a brace to strengthen the toggle levers and link members, and to hold the same in proper position under all circumstances.

The use of my improvement in connection with high speed vehicles of the automobile type and the use thereof, in case of the bursting of a tire, will be apparent, as the vehicle may be quickly brought to a stop in order that the tire may be replaced, or a new tire substituted, and injury to the rim of the wheel may thus be prevented, and when the vehicle is not in use the jack apparatus may be employed for supporting the weight thereof on the rollers $d^5$ and thus relieve the tires from the constant pressure at one point thereof occasioned by the weight of the vehicle, and in cases when the vehicle is in use, as for instance, in the case of a possible collision the jack apparatus may be employed for causing the vehicle to stop at the earliest possible instant.

My invention is not limited to the exact details of the jack apparatus or the separate parts thereof herein shown and described, and various changes therein and modifications thereof may be made, within the scope of the appended claims, without departing from the spirit of my invention or sacrificing its advantages, and I reserve the right to make all such alterations therein as fairly come within the scope of the invention.

Having fully described my invention what I claim as new and desire to secure by Letters Patent is:—

1. In a jack device of the class described, a rectangular main frame composed of top, bottom and side members, a vertically movable horizontal bar mounted in the bottom portion of said frame and provided with suspended rollers, toggle lever devices mounted between the top member of the main frame and said bar and having rollers operating in connection therewith, and means for operating said toggle lever devices so as to depress the rollers suspended by said bar below the main frame and lock the same in a depressed position.

2. In a jack device of the class described, a rectangular frame composed of top, bottom and side members, the top member being provided in the bottom thereof with a longitudinal groove, and the bottom member being composed of two parallel parts, and the side members being provided with vertical slots, a vertically movable horizontal bar mounted in said frame and the ends of which operate in said slots, said bar being provided in the top thereof with a groove and at the bottom thereof with suspended rollers, toggle lever devices mounted between the top member of the main frame and said bar and provided with rollers movable in the grooves in said member and bar, said toggle lever devices being pivotally connected, and means for operating said toggle lever devices to depress said bar, and the rollers connected therewith below the main frame.

In testimony that I claim the foregoing as my invention I have signed my name in presence of the subscribing witnesses this 18th day of June 1912.

MONTAGUE SIMPSON.

Witnesses:
C. MULREANY,
D. COLLINS.

Copies of this patent may be obtained for five cents each, by addressing the "Commissioner of Patents, Washington, D. C."